July 16, 1963     O. ERLANDSEN     3,097,877
VEHICLE BODY CONSTRUCTION
Filed Aug. 29, 1957     2 Sheets-Sheet 1
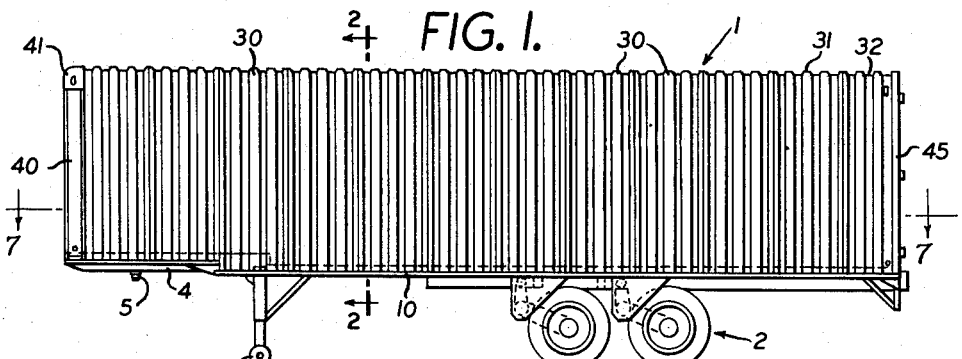
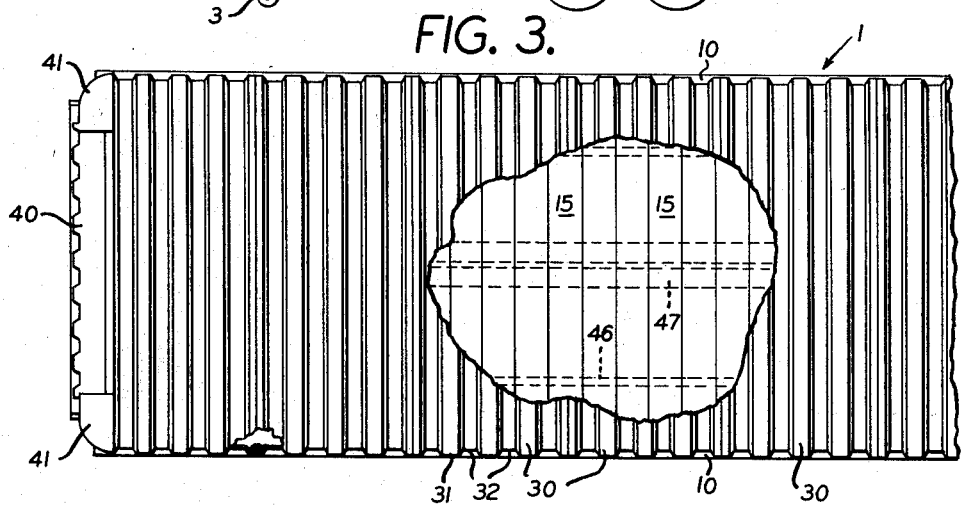
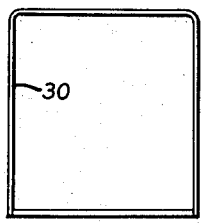
FIG. 4.
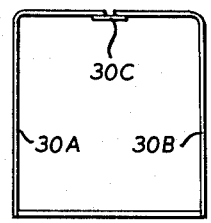
FIG. 5.
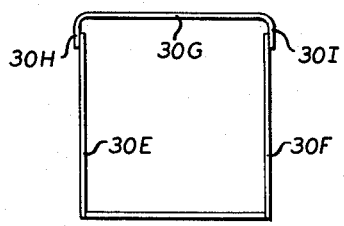
FIG. 6.
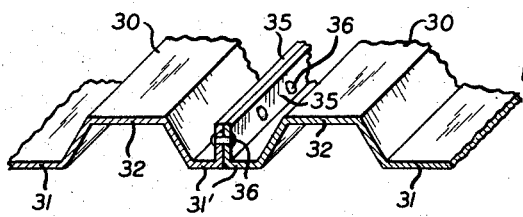
FIG. 7.
INVENTOR
Oscar Erlandsen
BY
ATTORNEY July 16, 1963 O. ERLANDSEN 3,097,877
VEHICLE BODY CONSTRUCTION
Filed Aug. 29, 1957 2 Sheets-Sheet 2

INVENTOR
Oscar Erlandsen
BY
ATTORNEY

United States Patent Office 3,097,877
Patented July 16, 1963

3,097,877
VEHICLE BODY CONSTRUCTION
Oscar Erlandsen, Garden City, N.Y., assignor to Grumman Aircraft Engineering Corporation, Bethpage, N.Y., a corporation of New York
Filed Aug. 29, 1957, Ser. No. 680,938
1 Claim. (Cl. 296—28)

This invention relates to improvements in vehicle bodies.

It is an object of the invention to provide an improved body construction for vehicles and, more particularly trailers, in which the side walls and top are formed in sections which may be readily assembled, permitting the construction of bodies having a variety of dimensions and with substantially standard components.

A second object is to provide a trailer body construction permitting the simplified assembly of elements, and in particular assembly of elements by riveting from one side only, as, for example, from the inside.

A third object of the invention is to provide an improved body construction eliminating or reducing discontinuity and providing maximum strength with minimum weight of metal.

A vehicle body construction embodying the invention in a preferred form will now be described with reference to the accompanying drawing, and the features forming the invention will then be pointed out in the appended claim.

In the drawing:

FIG. 1 is a side elevation of a trailer embodying the invention in a preferred form;

FIG. 3 is an enlarged fragmentary plan view;

FIGS. 4, 5 and 6 are schematic cross sections illustrating different forms of body element which may be utilized in forming the trailer of FIG. 1;

FIG. 7 is an enlarged fragmentary section and isometric view on the line 7—7 of FIG. 1, showing the form of body element and the manner of joining these elements together;

Figure 2:
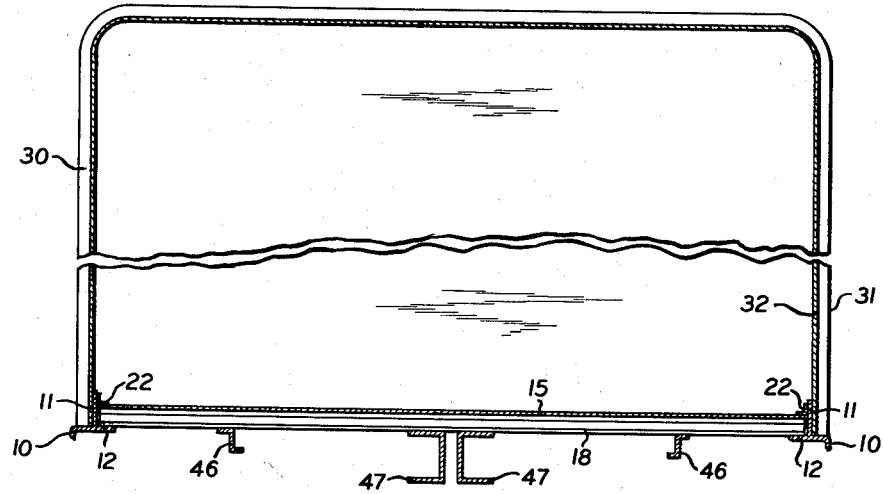
FIG. 2 is an enlarged typical cross section on the line 2—2 of FIG. 1.

The trailer comprises a body indicated generally at 1, supported by an aft wheel suspension indicated generally at 2, and a retractable front wheel 3, which serves to support the forward end of the trailer when not carried by a tractor. The forward end is formed with a platform 4 and coupling element 5 for securing the same to a tractor, as usual. The trailer structure comprises a pair of rub-rail elements 10 (FIGS. 1, 2 and 8) having vertical flanges 11 and inwardly facing horizontal flanges 12. The floor is formed by a series of transversely extending plank elements 15 having strengthening ribs 16 and 17, which latter ribs, in turn, have horizontal flanges 18 for further stiffening and strengthening the plank structure. The planks are formed at one side with a groove 19 and at the other with a tongue 20, which elements interfit so as to make a flush floor. The rub-rails 10 and planks 15 are conveniently and preferably formed as extruded aluminum alloy shapes.

The planks 15 are secured to the rub-rails 10 by riveting horizontal flanges 18 and rub-rail flanges 12, as indicated at 21, and by riveting the horizontal floor portions of the planks 15 to right angles 22, as indicated at 23, the angles 22 being, in turn, secured to the vertical flanges 11 of the rub-rails by the rivets 24.

Figure 8:
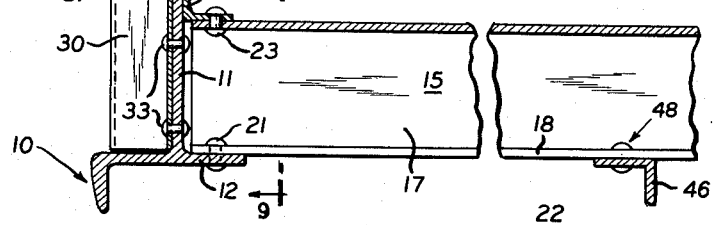
FIG. 8 is an enlarged view of a portion of FIG. 2, showing particularly the floor construction.
Figure 9:
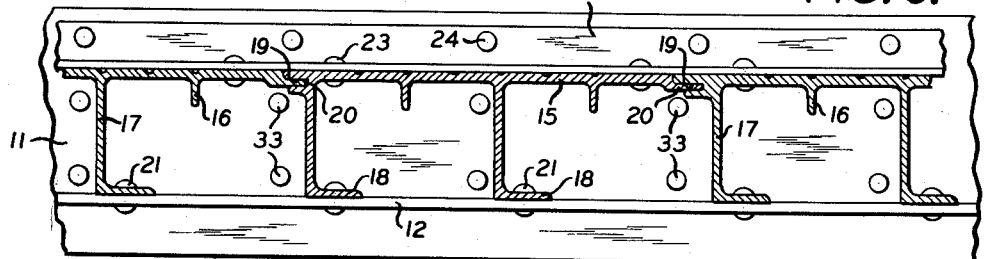
FIG. 9 is a section on the line 9—9 of FIG. 8.

The walls and top of the truck are formed of arch-shaped pieces 30 (FIGS. 1–4) having corrugations including ridges or convex sections 32 and depressed sections 31. These wall and top arch elements are secured to the vertical rub-rail flanges 11 by means of rivets 24 and 33, as indicated in FIGS. 8 and 9. The arch-shaped pieces 30 terminate in a half-width convex corrugation 31′, one side of which is a right angle flange 35, and the pieces 30 are joined together by rivets 36 passing through these flanges (FIG. 7).

It will be noted that practically the entire upper body work, consisting of the fastening together of these arches 30, may be done from inside the trailer, thus eliminating the need for riveting on one side and backing up from the other, which would require a man inside and outside the body during the assembly. The flange elements 35 terminate short of the plane of the inner surface of the elements 30 (plane of the depressions 32 thereof) so that fastening to the vertical flange 11 (FIG. 8) is not interfered with.

The structure is completed at the forward end by corrugated front wall panels 40 and corner pieces 41 and the rear end is completed by end frame and door elements 45. The structure may be rigidified and supported as desired by means of fore and aft members, as, for example, beams 46 and 47, extending lengthwise of the vehicle under the floor thereof and riveted to the horizontal flange sections 18 of the floor boards, as indicated at 48 in FIG. 8. Elements 46 and 47 serve to distribute the concentrated load over a number of the floor boards 15.

The body sections 30 may be formed as continuous arches including both side walls and top or ceiling, as indicated in FIG. 4, or they may be formed in two or more parts as indicated in FIGS. 5 and 6. In the structure of FIG. 5 a pair of half arches 30–A and 30–B are utilized together with a splicer element 30–C. As will be apparent, the width of the splicer section 30–C, the extent of overlap, and the width of the ceiling or top sections of the half arches 30–A and 30–B may be varied to suit particular conditions.

A second method of manufacture of the elements 30 is shown in FIG. 6 and involves the use of wall panels 30–E and 30–F, together with an arch top 30–G having its ends bent downwardly as at 30–H and 30–I and spliced to the wall panel sections, as indicated.

In either of the constructions of FIGS. 5 and 6, the use of rigid joint members is avoided together with any tendency toward discontinuity and concentration of stress.

Figure 10:
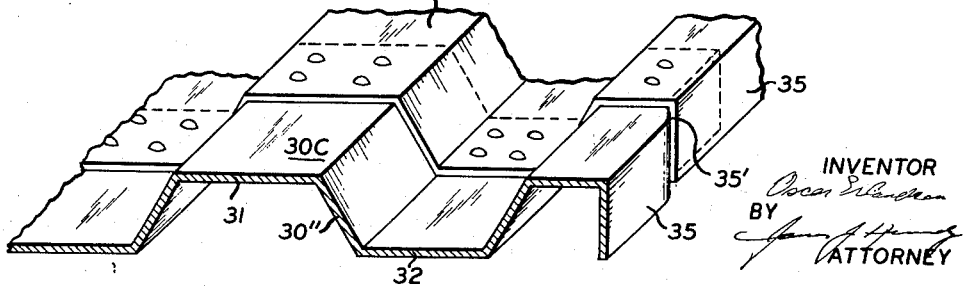
FIG. 10 is an isometric view showing the manner of forming a splice with the body elements of FIGS. 5 and 6.

The manner of forming a splice in the constructions of either of FIGS. 5 and 6, is shown in FIG. 10, and involves merely the laying of one end of a piece, as, for example, 30–B over the end of the splicing piece, as, for example, 30–C, the corrugations of one piece fitting into those of the other, as indicated, without interference. It is preferred to have the portions 30″ connecting the inner and outer corrugation elements 31 and 32 at a slant, an angle of about 60° to the plane of the sheet, as indicated, being suitable. This permits the interfitting of elements without interference, as shown. In splicing the body elements as shown in FIG. 10, the end of one of the edge flanges 35 is deformed slightly, as indicated at 35′ so as to fit inside the remaining element 35, thus permitting the fitting together of the piece being spliced and furnishing a flush flange surface 35 for attachment to the corresponding flange surface of adjacent components.

What is claimed is:

A metal trailer body construction comprising a plurality of inverted U-shaped corrugated panel elements, each comprising side wall portions and a top, inwardly facing abutting flanges on adjacent panel elements and terminating outside a plane tangent to the inner surface of the corrugated side wall panel elements, rivets securing said abutting flange elements together, a pair of rub-rails and means securing the lower edges of the said panel elements to the said rub-rails, the said panel elements comprising overlapped and spliced corrugated metal sections, each section comprising flat parallel inner and outer portions and flat connecting portions at an acute angle to the plane of parallelism of the first said portions, the inwardly facing abutting flanges on one of the said spliced sections being offset and fitting within and against the inwardly facing flange of the section spliced thereto, whereby the inwardly facing flange elements of the spliced sections present a substantially flat surface abutting the flanges of adjacent elements.

References Cited in the file of this patent
UNITED STATES PATENTS

| | | |
|---|---|---|
| 1,836,723 | Muchnic | Dec. 15, 1931 |
| 1,969,918 | Wright | Aug. 14, 1934 |
| 2,172,571 | Theriault | Sept. 12, 1949 |
| 2,502,703 | Chaplin | Apr. 4, 1950 |
| 2,694,475 | Crafton | Nov. 16, 1954 |
| 2,773,718 | Bohlen | Dec. 11, 1956 |